INVENTOR.
FRANCIS J. FIGIEL

BY

*Jay P. Friedenson*

ATTORNEY

INVENTOR.
FRANCIS J. FIGIEL
BY
*Vay P. Friedenson*
ATTORNEY

United States Patent Office 3,559,297
Patented Feb. 2, 1971

3,559,297
PROCESS AND APPARATUS FOR REMOVING WATER FROM SOLID SURFACES
Francis J. Figiel, Boonton, N.J., assignor to Allied Chemical Corporation, New York, N.Y., a corporation of New York
Filed Mar. 10, 1969, Ser. No. 805,561
Int. Cl. F26b 3/00
U.S. Cl. 34—9                          15 Claims

ABSTRACT OF THE DISCLOSURE

Process for removing water from a non-absorbent article comprises maintaining a boiling bath and a non-boiling bath of solvent which is heavier than water and in which water is about .1–5% by weight soluble, immersing the article to be treated into the non-boiling bath to displace water therefrom, causing the displaced water and solvent to overflow into a separation zone wherein water is removed from the system and solvent is transferred to the boiling bath, withdrawing the article from the non-boiling bath and exposing it to contact with the vapors of the solvent generated by the boiling solvent bath. A preferred solvent is an azeotropic mixture of about 97 weight percent 1,1,2-trichloro-1,2,2,-trifluoroethane and about 3 weight percent isopropanol. Apparatus comprises a dewatering sump, equipped with cooling means, positioned adjacent a water separating sump equipped with cooling means, which water separating sump collects water and solvent liquid which overflows from the dewatering sump, means for removing water from the water separating sump, a boiling sump, means for transferring solvent liquid from the water separating sump to the boiling sump, means for condensing solvent vapors generated in the boiling sump and cycling same to the non-boiling sump.

BACKGROUND OF THE INVENTION

There is a need in the art for procedure and equipment for the rapid and efficient drying of a variety of non-absorbent articles. For example, silicon wafers, copper and glass components used in miniaturized electronic circuits need to be dried quickly and thoroughly to avoid the formation of drying stains on the surfaces of such articles. Such stains comprise water-soluble soil material which would adversely affect the electrical properties of these articles. Articles which are heat sensitive cause additional problems in that temperatures used during the drying technique should not adversely affect the articles. A variety of methods and equipment have been devised in order to satisfactorily dry such articles and all suffer from one or more serious disadvantages. Thus, methods which are based on the use of air for evaporative drying are disadvantageous because high temperatures are employed and because the use of air in certain circumstances permits the formation of oxide films on the articles which adversely affects electrical properties. Solvent drying techniques and apparatus which are known in the art suffer from various disadvantages such as use of flammable solvents, contamination of the dried articles with an additional material such as a detergent which has to be removed, failure to provide a continuous mode of operation, and complication of equipment and equipment parts resulting in increased capital costs and operating expenses.

It is accordingly an object of this invention to provide a continuous dewatering process and apparatus capable of effectively and quickly removing water from the surfaces of water contaminated articles, without suffering from the disadvantages possessed by previously known drying methods and equipment.

A specific object of this invention is to provide a novel apparatus for drying water-contaminated non-absorbent articles which is simple in construction and operation and which therefore requires low capital costs and operating expenses.

Other objects and advantages of the invention will be apparent from the following description:

SUMMARY OF THE INVENTION

It has been discovered that the above objectives can be accomplished by the following method and apparatus.

The method comprises essentially immersing an article containing a water contaminated surface into a first solvent liquid bath comprising a liquid having a density greater than that of water and in which water is between about .1–5% by weight soluble, the solvent liquid being maintained at a temperature below its boiling point and in a substantially quiescent state. Water which is displaced from the article floats on the top of the solvent liquid bath. The displaced water, with accompanying amounts of solvent liquid displaced with the bath, overflows into a water separation zone. Water and the heavier solvent liquid are permitted to separate into two phases therein. Water which is collected in the water separation zone is continuously withdrawn from the system. Solvent liquid which is collected in the water separation zone is continuously transferred to a second solvent liquid bath which is substantially water-free and is maintained in a boiling state thereby generating substantially water-free solvent vapors. The article is removed from the first solvent liquid bath, is exposed to the solvent vapors generated in the second solvent liquid bath and is removed from the system. The solvent vapors generated in the second solvent liquid bath are condensed and cycled to the first solvent liquid bath at a rate sufficient to replace the solvent liquid displaced from the first solvent liquid bath.

The apparatus comprises essentially the following in combination: A dewatering sump equipped with cooling means, a water separating sump possessing a smaller surface area than the dewatering sump adapted to receive liquid which overflows from the dewatering sump, which water separating sump is equipped with cooling means and includes means for removing water from the upper portion thereof, a boiling sump including heating means, possessing a larger surface area than the water separating sump, means for transferring liquid from the lower portion of the water separating sump to the boiling sump, means for condensing vapors generated in the boiling sump, and means for cycling the condensate to the dewatering sump.

DETAILED DESCRIPTION OF THE INVENTION AND OF THE PREFERRED EMBODIMENTS

Figure 2:
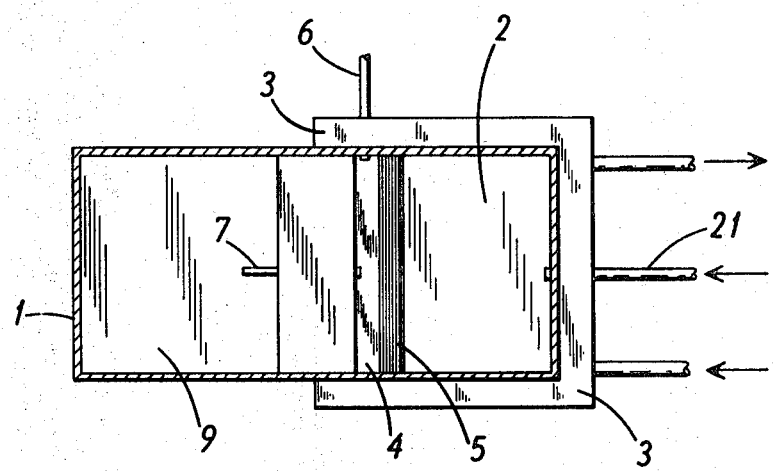
FIG. 2 is a plan view of the embodiment of FIG. 1 viewed through cutting plane 2—2 of FIG. 1, excluding the dryer, reservoir, pump and associated conduits.

Solid surfaces which can be treated in accordance with the invention may be constructed of a wide variety of non-absorbent solid materials which are commonly used in manufacturing shaped articles. The material of construction of the article should, of course, be inert to the solvent employed. Illustrative materials of construction include a variety of metallic materials such as ferrous metals, copper, nickel, chromium, stainless steel, aluminum and alloys thereof. Examples of suitable non-metallic materials are glass and plastics, such as polytetrafluoroethylene, polychlorotrifluoroethylene, polyethylene and nylon. The articles may be formed as machined parts such as silicon wafers, copper printed boards and the like. The shape of the articles is not critical for the process and apparatus of the invention are effective in removing even small traces of water from small cracks and crevices as well as from large surfaces.

The solvent which is used in the process is critical. Essentially, the solvent must be one which is heavier than water and in which water is between about .1–5% by weight soluble. Any solvent which meets these characteristics is operable in the subject process. Approximately a .1% by weight minimum solubility of water in the solvent is necessary in order for the solvent to penetrate the water film and readily displace the water. Preferably, however, the solvent should be one in which water is at least .5% by weight soluble. If water is more than about 5% by weight soluble in the solvent, sufficiently efficient separation of water from solvent is not possible according to the invention process. The ideal solvent for the novel process is one which possesses all of the following characteristics: maintains its original composition, temporarily decreases the overall surface free energy in order to break up water films and wet the substrate, effectively washes water from the wetted objects, is essentially immiscible with water, and evaporates without leaving a stain. A number of single substances may be used alone in the novel method. Illustrative of such single substances are the following: 1,1,2-trichloro-1,2,2-trifluoroethane and tetrachlorodifluoroethane. (Tetrachlorodifluoroethane may be used alone as the sym- or unsym-isomer. It is sold commercially, however, as a mixture of these two isomers and may be used as a solvent in the process described herein in this form. The isomeric mixture behaves like a single substance and will be so regarded herein.) There is no single substance known which is outstanding for the present purposes, however, solvents which perform better than the single substances known may be devised by mixing two or more single solvent materials. In the light of the above discussion, one of ordinary skill in the art can readily devise suitable solvent mixtures by routine testing and evaluation for the desired properties.

A preferred class of solvent mixtures is that in which the mixture contains at least one substantially water-immiscible halogenated hydrocarbon component boiling between about 20–100° C. and having a density greater than about 1.3 gm./cm.$^3$ at 20° C. and at least one non-halogenated organic liquid miscible with the halogenated hydrocarbon component and with water, which boils between about 20–150° C. and has a density less than about 1.0 gm./cm.$^3$ at 20° C. Surprisingly, it has been found that the presence of water as an azeotrope with one or more of the mixture components does not adversely affect the invention process.

A particularly effective class of solvents are two component solvents in which the water-immiscible and water-miscible components are as described above and in which the water-immiscible component constitutes between about 80–99.5 weight percent of the mixture. The preferred water-immiscible component is a member of the group consisting of 1,1,2-trichloro-1,2,2-trifluoroethane and tetrachlorodifluoroethane. The preferred water-miscible component is selected from the group consisting of methanol, ethanol, n-propanol, isopropanol, acetonitrile, acetone, nitromethane and dioxane.

The preferred solvent is a mixture of 1,1,2-trichloro-1,2,2-trifluoroethane and isopropanol. The weight percent of 1,1,2-trichloro-1,2,2-trifluoroethane should be in the range of about 85–98%, still preferably from 90–98%, and most preferably about 97%. The 97 weight percent mixture is most preferred because it is a constant boiling azeotropic mixture which maintains its composition during use. When non-azeotropic mixtures of 1,1,2-trichloro-1,2,2-trifluoroethane and isopropanol are employed, the mixtures fractionate upon boiling in the boiling sump. In this case an excess of isopropanol accumulates in the boiling sump and thus, eventually, composition adjustment is required. The need for composition adjustment is characteristic of the use of non-azeotropic mixtures, whether or not an azeotropic system exists between the mixture components. The advantage of using constant boiling azeotropic mixtures can thus be appreciated.

The novel process and apparatus of the invention may be more readily understood by reference to the drawings which illustrate preferred embodiments.

Figure 1:
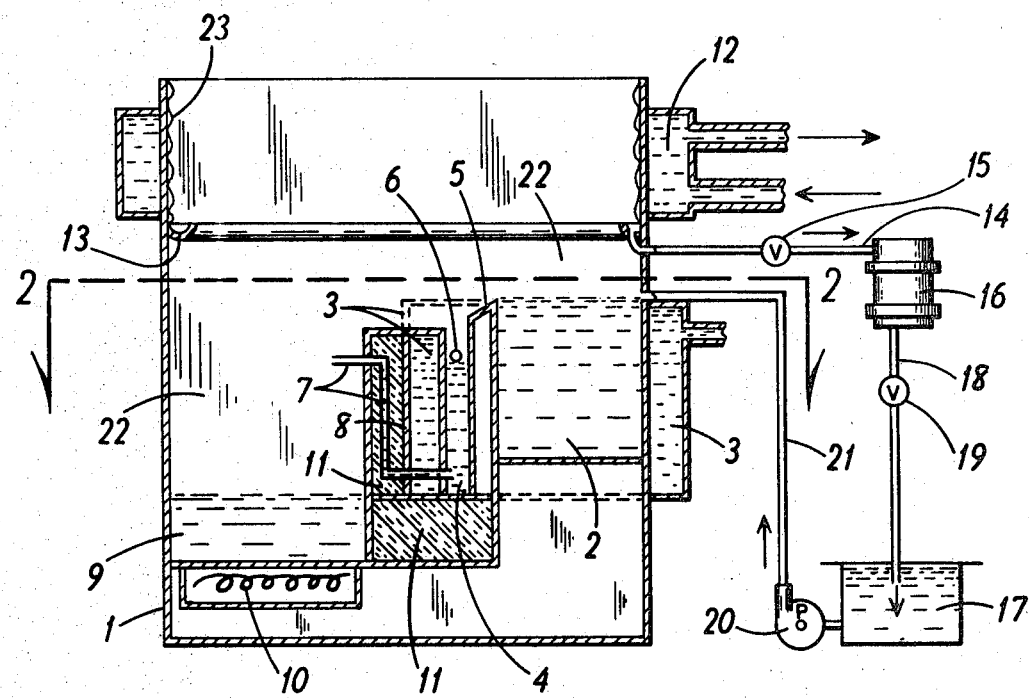
FIG. 1 is a front view in partial half section of one embodiment of the invention showing the component parts integrally contained in an open-top treatment vessel.

Although all the apparatus components need not be assembled in a single container, in the preferred embodiment of FIGS. 1 and 2, the components are all assembled in an open top treatment vessel 1. A rectangular dewatering sump 2, cooled by water jacket 3, is positioned adjacent a rectangular water separating sump 4 so that liquid contained in the dewatering sump can overflow over wall 5 of dewatering sump 2 into the water separating sump 4. The water separating sump has a smaller surface area than the dewatering sump. Water separating sump 4 is equipped with an overflow pipe 6 which protrudes from the upper portion of the water separating sump and extends outwardly through the wall of treatment vessel 1 and cooling jacket 3, permitting the continuous removal of water which rises to the surface of the solvent and water mixture which collects in water separating sump 4. Water jacket 3 extends around water separating sump 4. A drain pipe 7 in the lower portion of water separating sump 4 extends outwardly through the wall 8 of the water separating sump and runs parallel to wall 8 before turning to empty into boiling sump 9, permitting the continuous transfer of solvent collected towards the bottom of water separating sump 4 to boiling sump 9. Boiling sump 9 possesses a larger surface area than water separating sump 4. The height of drain pipe 7 determines the level of solvent in water separating sump 4. Overflow pipe 6 is connected to the water separating sump at a point slightly below the level of drain pipe 7. Heating means 10 is provided at the bottom of boiling sump 9 to boil the solvent contained in sump 9. Insulating material 11, such as polyurethane or glass fibers, is provided between water separating sump 4 and boiling sump 9 to prevent heat exchange therebetween.

It is essential that the surface area of water separating sump 4 is smaller than the surface area of either dewatering sump 2 or boiling sump 9. Preferably, the ratio of the area of the opening of the water separating sump to the area of the opening of the dewatering sump or to the area of the opening of the boiling sump, should be between about 1:5 and 1:100 and still preferably between about 1:10 and 1:20.

The upper portion of treatment vessel 1 is equipped with a cooling jacket 12 to condense solvent vapors generated from the boiling sump. A trough 13 is provided around the perimeter of the treatment vessel below the cooling jacket to collect condensate running down the walls of the treatment vessel. Pipe 14, controlled by valve 15, optionally conveys the solvent condensate through a dryer 16 and from there solvent condensate is fed to a reservoir 17 through pipe 18, controlled by valve 19. Pump 20 then feeds the solvent through pipe 21 into dewatering sump 2. Preferably, as shown in FIG. 1, pipe 21 terminates on a level with the top of dewatering sump 2 so that the solvent feed through pipe 21 helps push the water layer rising to the top of the solvent liquid in dewatering sump 2 over wall 5 into water separating sump 4. Pipe 21 may terminate with a perforated section (not shown in the drawing) extending into treatment vessel 1 in order to more effectively contact the water layer with the cycled solvent liquid stream.

Figure 4:
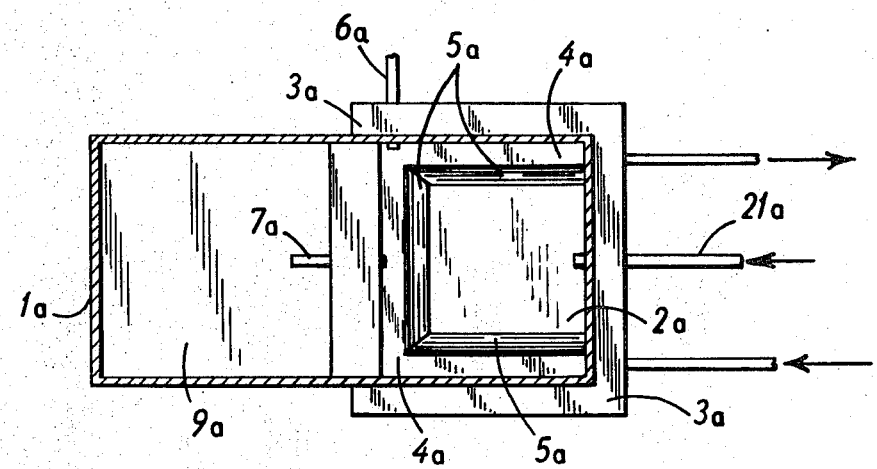
FIG. 4 is a plan view of the embodiment of FIG. 3.
Figure 3:
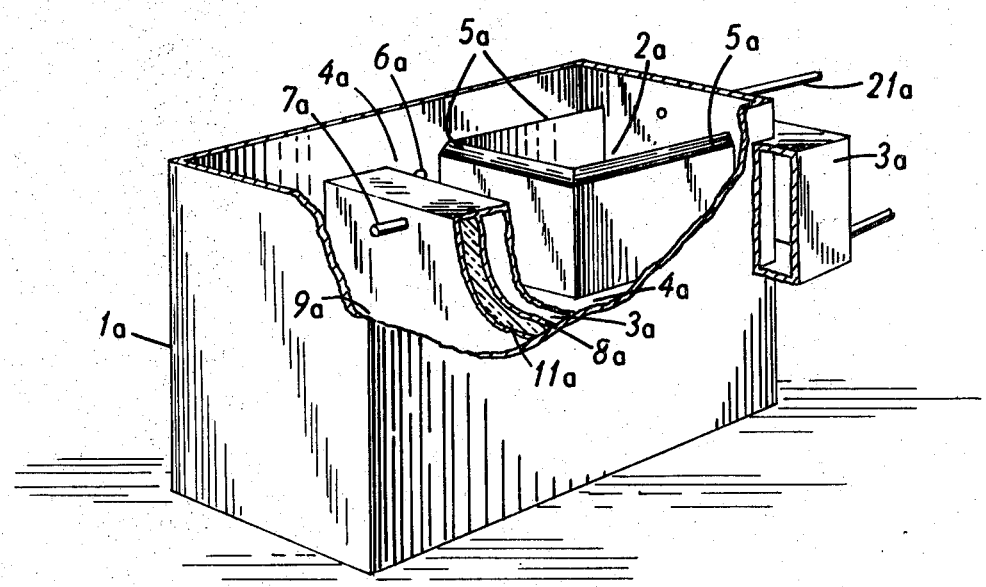
FIG. 3 is a perspective view in partial section of another embodiment of the invention, with the condensing section cut away, also showing the component parts integrally contained in an open-top treatment vessel.

FIGS. 3 and 4 show another embodiment of the invention in which the water separating sump is essentially U-shaped and the dewatering sump is rectangular in shape and is positioned within the U of the water separating sump so that overflow of liquid from the dewatering sump into the water separating sump can take place over three walls of the dewatering sump. The components shown in FIGS. 3 and 4 which have corresponding members in FIGS. 1 and 2 have been assigned the same numbers, accompanied by the letter *a*.

With specific reference to FIGS. 1 and 2, in operation, a suitable solvent liquid is charged to partially fill boiling sump 9 and to completely fill dewatering sump 2. The quantity of solvent charged to boiling sump 9 is not critical as long as sufficient solvent is maintained therein in the liquid phase to provide a continuous source of solvent vapor when boiled. The solvent bath in boiling sump 9 is heated to boiling by means of heater 10. Solvent vapors are generated and rise to permeate vapor space 22. Cooling water is circulated through cooling jackets 3 and 12. The temperature of the water coolant in cooling jacket 3 is maintained at about ambient temperatures. This controls the temperature of the liquid in dewatering sump 2 and water separating sump 4 to at least about 10° C. above the dew point of the environment. Under such conditions the tendency for moisture in the air to become absorbed in the liquid is minimized. The temperature of the water coolant in cooling jacket 12 is controlled so as to create a good condensing surface on the upper portion of the inner walls of the treatment vessel.

The article to be treated is immersed into the solvent liquid bath of dewatering sump 2. The solvent displaces the water from the article and the displaced water floats to the surface of the heavier, substantially water-immiscible solvent, first as small droplets and later as a thin continuous layer as greater quantities of water are displaced. The volume of the article immersed in dewatering sump 2, as well as the volume of water displaced, causes liquid to overflow from dewatering sump 2 over wall 5 into water separating sump 4. This liquid comprises essentially the water layer formed on top of the heavier solvent layer in dewatering sump 2, together with quantities of displaced solvent. The solvent and water which collects in water separating sump 4 separates into two layers, the heavier solvent layer on the bottom. The upper water layer is continuously withdrawn through overflow pipe 6. The lower solvent layer is withdrawn through drain pipe 7 and overflows into boiling sump 9. The solvent in boiling sump 9 is substantially water-free. The substantially water-free solvent vapors generated in boiling sump 9 rise into vapor space 22 and condense on the upper portion of the inside walls of the treatment vessel in the vicinity of cooling jacket 12. The condensed solvent vapors 23 run down the walls of the treatment vessel into trough 13 from where it is eventually cycled to dewatering sump 2 through the recycling equipment 14, 15, 16, 17, 18, 19, 20 and 21 discussed above. The cycle rate of solvent into dewatering sump 2 is regulated so as to maintain the level of solvent in dewatering sump 2 at the top of the sump. No substantial amount of solvent is lost from the system, except incidentally as vapor loss. Solvent makeup can be added to solvent feed cycle pipe 21 as necessary.

The length of time of immersion of the article in the liquid bath of dewatering sump 2 is not critical. Generally, between about 10–30 seconds dip time is all that is required. Preferably, the dip time is between about 20–30 seconds. A gentle swirling type action may be imparted to the bath in whch the article is immersed in order to aid in the displacement of water. It is not desired to significantly agitate this bath, however, since this would promote increased solubility of the water in the solvent and complicate subsequent water separation. Accordingly, the solvent liquid bath in the dewatering sump is maintained in a substantially quiescent state.

When the article is withdrawn from the solvent liquid bath in the dewatering sump, it is suspended in vapor space 22 and exposed to the solvent vapors generated by the boiling solvent liquid bath in boiling sump 9 to flash off minute traces of moisture that may still be present on the article. Generally, about 5–30 seconds are all that are required for this purpose, however, a vapor hold time of about 5–20 seconds is preferred.

The following examples illustrate practice of the invention and the results obtained.

EXAMPLE I

This example illustrates the effectiveness of the use of a solvent mixture comprising the azeotrope of about 97 weight percent 1,1,2-trichloro - 1,2,2 - trifluoroethane and about 3 weight percent isopropanol in drying water-contaminated articles according to the novel process and apparatus.

The apparatus employed is substantially as shown in FIG. 1. The capacity of dewatering sump 2 is one (1) gallon. The ratio of the surface area of the water separating sump 4 to the surface area of dewatering sump 2 and boiling sump 9 is 1:10:10. About ⅔ gallon of solvent is charged to boiling sump 9 and the one (1) gallon dewatering sump is completely filled with solvent. Cooling water at about 25° C. is circulated through cooling jackets 3 and 12. Solvent is boiled in boiling sump 9.

A cluster of four steel bearings, each about one inch in diameter and ⅜ inch in thickness and contaminated with water, are dipped into the solvent liquid contained in dewatering sump 2 and removed after about thirty (30) seconds. The cluster of bearings is then exposed to solvent vapors in vapor space 22 for about twenty (20) seconds. After about 5–10 seconds exposure to air, the bearing cluster is dipped into a flask containing 100 ml. of anhydrous isopropanol. The bearing cluster is thoroughly washed in the isopropanol and is removed from the flask. The amount of water contained on the wet bearing cluster is determined by weight comparison of the bearing cluster before and after contamination by water. The amount of water dissolved in the solvent charged to the system and in the isopropanol before and after the wash is determined with Karl Fischer apparatus and reagent (ASTM D1744–64). The above-described drying procedure was repeated ten (10) times. The results of the water analysis is shown in the following Table I.

TABLE I

| Sample: | Amount of water |
| --- | --- |
| Solvent charged to the drying system _____p.p.m__ | 200 |
| 100 ml. isopropanol before drying sequence _____gm__ | 0.019 |
| Wet bearing cluster _____gm__ | 0.41 |
| 100 ml. isopropanol after first drying sequence _____gm__ | 0.019 |
| 100 ml. isopropanol at the end of ten (10) drying sequences _____gm__ | 0.020 |

The above data show that the bearing cluster is thoroughly dry after treatment in accordance with the invention process and that the presence of 200 p.p.m. water in the solvent charged to the system has no adverse effect on the drying process.

EXAMPLE II

This example illustrates the effectiveness of the novel process and apparatus in disposing of water introduced into the system.

About 500 gms. of water are added drop-wise from a funnel directly to the dewatering sump of the apparatus set up as described in Example I. Water is continuously removed from the system through overflow pipe 6 until the system stabilizes itself, that is until no more water drains from overflow pipe 6. An additional increment of 200 gms. of water are added drop-wise and the system is stabilized. At this point the procedure of Example I is repeated to ascertain the effect, if any, on the ability of the system to dry wet bearing clusters. The 100 ml. isopropanol wash liquid shows 0.020 gm. water after the drying procedure, thereby demonstrating that the system is still capable of removing water from articles to a very high tolerance. Another 50 gms. increment of water is added to the dewatering sump and the system is stabilized. The water content of the solvent in the dewatering and boiling sumps is determined by Karl Fischer analysis after each 500, 200 and 50 gms. increment of water is added and the system is stabilized. The results are shown in following Table II.

TABLE II

| | Weight percent of water in boiling sump | Weight percent of water in dewatering sump |
|---|---|---|
| Amount of water added: | | |
| 500 gms | 0.24 | 0.20 |
| 200 gms | 0.20 | 0.10 |
| 50 gms | 0.10 | 0.04 |

The above data show that the system is capable of continuously disposing very large quantities of water without affecting its capability of thoroughly drying wet articles.

It will be apparent to those skilled in the art that numerous modifications and changes may be made to the embodiments described herein without departing from the scope and spirit of the invention.

I claim:

1. A method for removing water from a nonabsorbent article which comprises:
   (a) immersing an article containing a water contaminated surface into a first solvent liquid bath comprising a liquid having a density greater than that of water and in which water is between about .1–5% by weight soluble, the solvent liquid being maintained at a temperature below its boiling point and in a substantially quiescent state, whereby the water which is displaced floats on the top of the solvent liquid bath,
   (b) causing the displaced water with accompanying amounts of solvent liquid displaced from the bath to overflow into a water separation zone and permitting water and the heavier solvent liquid to separate into two phases therein,
   (c) continuously withdrawing from the system water which is collected in the water separation zone,
   (d) continuously transferring solvent liquid which is collected in the water separation zone to a second solvent liquid bath which is substantially water-free and is maintained in a boiling state, thereby continuously generating substantially water-free solvent vapors,
   (e) removing the article from the first solvent liquid bath and exposing the article to the solvent vapors generated in the second solvent liquid bath,
   (f) condensing the solvent vapors and cycling the condensed solvent liquid to the first solvent liquid bath at a rate sufficient to replace the solvent liquid displaced from the first solvent liquid bath, and
   (g) removing the article from the system.

2. The method according to claim 1 in which the solvent is one in which water is between about .5–5% by weight soluble.

3. The method according to claim 2 in which the solvent contains at least one substantially water-immiscible halogenated hydrocarbon component boiling between about 20–100° C. and having a density greater than about 1.3 gm./cm.$^3$ at 20° C. and at least one non-halogenated organic liquid miscible with the halogenated hydrocarbon component and with water which boils between about 20–150° C. and has a density less than about 1.0 gm./cm.$^3$ at 20° C.

4. The method according to claim 3 in which the solvent is a two component mixture in which the substantially water-immiscible component constitutes between about 80–99.5 weight percent of the mixture.

5. The method according to claim 4 in which the substantially water-immiscible component is a member of the group consisting of 1,1,2-trichloro-1,2,2-trifluoroethane and tetrachlorodifluoroethane and in which the water miscible component is a member of the group consisting of methanol, ethanol, n-propanol, isopropanol, acetonitrile, acetone, nitromethane and dioxane.

6. The method according to claim 5 in which the substantially water-immiscible component is 1,1,2-trichloro-1,2,2-trifluoroethane and in which the water miscible component is isopropanol.

7. The method according to claim 6 in which the solvent mixture contains between about 90–98 weight percent of 1,1,2-trichloro-1,2,2-trifluoroethane.

8. The method according to claim 7 in which the solvent mixture is an azeotropic mixture consisting of about 97 weight percent of 1,1,2-trichloro-1,2,2-trifluoroethane and about 3 weight percent isopropanol.

9. Apparatus for the removal of water from non-absorbent articles which comprises in combination:
   (a) a dewatering sump equipped with cooling means,
   (b) a water separating sump possessing a smaller surface area than the dewatering sump adapted to receive flows from the dewatering sump, which water separating sump is equipped with cooling means and includes
   (c) means for removing water from the upper portion thereof,
   (d) a boiling sump, including heating means, possessing a larger surface area than the water separating sump,
   (e) means for transferring liquid from the lower portion of the water separating sump to the boiling sump,
   (f) means for condensing vapors generated in the boiling sump, and
   (g) means for cycling the condensate to the dewatering sump.

10. Apparatus according to claim 9 in which components (a) through (f) are contained within a single treatment vessel and in which the water separating sump is positioned adjacent the dewatering sump so that liquid which overflows from the dewatering sump falls directly into the dewatering sump.

11. Apparatus according to claim 10 in which insulating means is provided between the water separating sump and the boiling sump to minimize heat exchange therebetween.

12. Apparatus according to claim 11 in which the means for removing water from the water separating sump is an overflow pipe and the means for transferring liquid from the water separating sump to the boiling sump is a drain pipe.

13. Apparatus according to claim 12 in which the means for cycling the condensate to the dewatering sump includes a drying means and a reservoir.

14. Apparatus according to claim 12 in which the dewatering and water separating sumps are essentially rectangular in shape and are positioned adjacently so that overflow of liquid from the dewatering sump to the water separating sump can take place only over a single wall of the dewatering sump.

15. Apparatus according to claim 12 in which the water separating sump is essentially U-shaped and the dewatering sump is rectangular in shape and is positioned within the U of the water separating sump so that overflow of liquid from the dewatering sump into the water separating sump can take place over three walls of the dewatering sump.

References Cited

UNITED STATES PATENTS 3,386,181   6/1968   Steinacker _____ 34—9

JOHN J. CAMBY, Primary Examiner